United States Patent
Nagasaka et al.

(10) Patent No.: US 7,263,895 B2
(45) Date of Patent: Sep. 4, 2007

(54) STRAIN DETECTOR AND METHOD OF MANUFACTURING THE SAME

(75) Inventors: Hiroshi Nagasaka, Tokyo (JP); Takeshi Abe, Tokyo (JP); Yoshikazu Kaneko, Tokyo (JP)

(73) Assignee: Nagano Keiki Co., Ltd., Tokyo (JP)

( * ) Notice: Subject to any disclaimer, the term of this patent is extended or adjusted under 35 U.S.C. 154(b) by 138 days.

(21) Appl. No.: 11/182,341

(22) Filed: Jul. 15, 2005

(65) Prior Publication Data

US 2006/0016268 A1    Jan. 26, 2006

(30) Foreign Application Priority Data

Jul. 23, 2004   (JP)   ............... 2004-216651

(51) Int. Cl.
*G01B 7/16*    (2006.01)

(52) U.S. Cl. ............... 73/777; 73/715; 73/723; 73/725; 73/726; 73/761; 73/774; 73/862.381; 73/862.391; 73/862.451; 73/862.454; 73/862.471; 73/862.473; 73/862.474; 73/862.581

(58) Field of Classification Search ............ 73/715, 73/723, 725, 726, 761, 774, 777, 862.381, 73/862.391, 862.451, 862.454, 862.471, 73/862.473, 862.474, 862.581
See application file for complete search history.

(56) References Cited

U.S. PATENT DOCUMENTS

| 4,840,067 | A |   | 6/1989  | Nishida et al. |           |
|-----------|---|---|---------|----------------|-----------|
| 4,938,045 | A |   | 7/1990  | Rosenstock et al. |        |
| 4,986,861 | A | * | 1/1991  | Nishida et al. | 156/89.16 |
| 5,059,556 | A | * | 10/1991 | Wilcoxen       | 438/52    |
| 6,393,919 | B1 | * | 5/2002  | Ohji et al.   | 73/708    |
| 6,432,845 | B1 | * | 8/2002  | Morozumi      | 438/789   |
| 6,812,123 | B2 | * | 11/2004 | Matsumoto et al. | 438/612 |
| 6,812,127 | B2 | * | 11/2004 | Oshima et al. | 438/622   |
| 2004/0063238 | A1 | * | 4/2004 | Nagasaka et al. | 438/50 |
| 2005/0103111 | A1 | * | 5/2005 | Imai et al.    | 73/715 |
| 2005/0193826 | A1 | * | 9/2005 | Oda et al.     | 73/715 |
| 2005/0252299 | A1 | * | 11/2005 | Oda           | 73/715 |
| 2005/0284228 | A1 | * | 12/2005 | Toyoda        | 73/726 |
| 2006/0053894 | A1 | * | 3/2006  | Kunda et al.  | 73/715 |
| 2006/0090566 | A1 | * | 5/2006  | Oda           | 73/715 |
| 2006/0156825 | A1 | * | 7/2006  | Toyoda et al. | 73/723 |

FOREIGN PATENT DOCUMENTS

| EP | 1 403 629 A2 | 3/2004  |
|----|--------------|---------|
| JP | 63266022     | 11/1988 |
| JP | 05013782     | 1/1993  |
| JP | 2000275128   | 10/2000 |
| JP | 2001-242031  | 9/2001  |

* cited by examiner

*Primary Examiner*—Edward Lefkowitz
*Assistant Examiner*—Freddie Kirkland, III
(74) *Attorney, Agent, or Firm*—Rankin, Hill, Porter & Clark LLP

(57) ABSTRACT

A fluid pressure sensor (1) for measuring the pressure of a fluid comprises a diaphragm portion (12) which is a strain generating body, a silicon oxide film (21) as an insulating film, and a strain gauge (20) made of crystalline silicon, and austenitic precipitation hardening type Fe—Ni heat-resisting steel excellent in mechanical strength and corrosion resistance is used for the diaphragm portion (12). The silicon oxide film (21) is formed with the internal stress thereof adjusted to the range from −150 to 130 MPa. With this feature, the fluid pressure sensor (1) ensures high precision and reliability, and may be used even for measurement of a highly corrosive fluid.

5 Claims, 6 Drawing Sheets

STRAIN DETECTOR AND METHOD OF MANUFACTURING THE SAME

BACKGROUND OF THE INVENTION

1. Field of the Invention

The present invention relates to a strain detector for measuring an external stress by converting strain generated in a strain generating body to an electric signal, and a method of manufacturing the same.

2. Description of Related Art

There have been developed various types of strain detectors for measuring an external stress using a strain generating body in which a component is strained according to an external stress, and a strain gauge for converting a strain of the strain generating body to an electric signal. For instance, in a strain detector currently available for measuring the pressure of a fluid such as a gas or a liquid, a strain generating body is strained by the pressure of a fluid, and the strain is converted to an electric signal indicating the pressure of the fluid.

As the strain detector for measuring the pressure of a fluid, there have been known, for instance, a strain detector disclosed in the document: Japanese Patent Laid-Open Publication No. 2001-242031. This strain detector includes a diaphragm portion for generating strain according to the pressure of a fluid and a strain gauge for detecting the generated strain as an electric signal, and is used for measuring the pressure of a fluid flowing through piping. The diaphragm portion is made of 17-4 stainless steel, and has a thin wall portion which is elastically deformed by the pressure of a fluid and generates strain. The strain gauge is prepared by adhering a plurality of resistance wire strain gauges on the thin wall portion respectively with a glass material to form a circuit. This glass material functions as an adhesive between the thin wall portion and the resistance wire strain gauge, and at the same time functions as an insulating material for shutting off electric conduction between the thin wall portion and the resistance wire strain gauge. In the strain detector having the configuration as described above, when a fluid, which is the object to be measured, acts to the thin wall portion of the diaphragm portion, the thin wall portion is strained due to the pressure of the fluid, and the resistance wire strain gauge detects the strain as an electric signal, amplifies and converts this electric signal, thus a pressure value of the fluid is obtained.

When it is tried to detect a pressure value for a fluid with higher precision, it is preferable to generate a higher strain, and for that purpose, the thickness of the thin wall portion of the diaphragm portion should preferably be as small as possible. Further, since this thin wall portion receives high pressure from a fluid, which is the object to be measured, the material for the diaphragm portion is required to have a high tensile strength. To satisfy the requirement, 17-4 stainless steel, which is martensitic precipitation hardening type stainless steel, is used as a material for the diaphragm, and because this material has the high tensile strength of 1300 MPa or more, a highly accurate measured value can be obtained, and the 17-4-stainless steel is well suited to be used as a material for the diaphragm of a strain detector.

However, although this martensitic precipitation hardening type stainless steel is excellent in the mechanical strength, the corrosion resistance is not so high, and therefore availability of the strain detector disclosed in the document is limited especially when measuring the pressure of fluids such as highly corrosive acidic gases, chemical agents, or hydrogen gas which causes embrittlement, or the like.

Further, when the thin wall portion with smaller thickness is formed by using a material having the high tensile strength such as the martensitic precipitation hardening type stainless steel in the diaphragm, the thin wall portion can generate large strain, but the glass material used for jointing the thin wall portion and the resistance wire strain gauge receives a large stress from the thin wall portion.

In the conventional technology for strain gauging including an aforesaid strain gauge, the glass material or a polyimide-based adhesive is used for junction between the resistance wire strain gauge and the diaphragm. When a strain detector made by using the aforesaid adhesive in the aforesaid diaphragm portion is used for a long time, juncture between the diaphragm and the resistance wire strain gauge becomes weaker, and strain of the diaphragm can not accurately be detected as an electric signal, namely a highly reliable measured pressure value can no longer be obtained. Further, since the strain detector requires the work for adhering a plurality of resistance strain gauges discretely with an adhesive, manufacture of the strain detector takes a long period of time and much labor load, which are also disadvantageous.

The problems as described above are not limited to the field of strain detectors for measuring the pressure a fluid, and also other general strain detectors have the same problems

SUMMARY OF THE INVENTION

A main object of the present invention is to provide a strain detector ensuring high precision and reliability and excellent in corrosion resistance, and a method of manufacturing the same.

The aforesaid object of the present invention is achieved by forming a strain generating body with austenitic precipitation hardening type Fe—Ni heat-resisting steel which has a high mechanical strength similar to that of the martensitic precipitation hardening type stainless steel and is excellent in corrosion resistance, and forming an insulating film containing a silicon oxide film, with the internal stress thereof adjusted, on the strain generating body. More specifically the strain detector according to the present invention includes a strain generating body generating strain in response to an external stress, an insulating film formed on at least a portion of the strain generating body, and a strain gauge formed on the insulating film for detecting strain generated in the strain generating body as an electric signal, and is characterized in that the strain generating body is formed of austenitic precipitation hardening type Fe—Ni heat-resisting steel and the insulating film is formed from a silicon oxide film.

With the present invention, the austenitic precipitation hardening type Fe—Ni heat-resisting steel which is excellent in the mechanical strength is used as a material for a strain generating body generating strain, so that it is possible to provide a strain detector insuring high precision and reliability. Further the austenitic precipitation hardening type Fe—Ni heat-resisting steel is also excellent in corrosion resistance, so that the strain detector according to the present invention can be used for measuring stress of acidic gases and highly corrosive materials, the pressure of which is difficult to be measured with conventional technology, and further the strain detector according to the present invention can be used for stress measurement even in the environment exposed to hydrogen gas which causes embrittlement.

Further, since the insulating film is formed including the silicon oxide film capable of adjusting an internal stress of the insulating film, considering the differences in the thermal expansion coefficient as well as in the elastic coefficient between the silicon oxide film and the austenitic precipitation hardening type Fe—Ni heat-resisting steel, therefore even when the strain detector is used for a long time and the insulating film continuously receives a large stress from the strain generating body, junction between the strain generating body and the insulating film is not degraded by adjusting an internal stress of the insulating film, which enables measurement of a pressure value with high reliability. Further, since the insulating film can be formed all at once with conventional film-forming technology, time and labor required for manufacturing the strain gauge are reduced compared to those required with conventional technology.

In the present invention, the silicon oxide film should preferably have the internal stress thereof adjusted to the range from −150 to 130 MPa. Because of this feature, even if the strain detector is exposed to an atmosphere having the temperature in the range from −40 to 550° C., cracking never occurs within the structure of the silicon oxide film, and junction between the strain generating body and the insulating film is not degraded.

Further, in the present invention, the silicon oxide film should preferably have the thickness thereof adjusted in the range from 2 to 15 μm. Because of this feature, the insulating capability of the silicon oxide film is insured, and cracking due to the too thick film never occurs within the structure of the silicon oxide film.

Further, in the present invention, the strain gauge should preferably be a crystalline silicon thin film. With this feature, a crystalline silicon thin film can be formed on the silicon oxide film without using any adhesive, and in addition, the crystalline silicon thin film can be formed all at once with conventional film-forming technology, and therefore the time and labor required for manufacture of the strain gauge are reduced compared to those required with conventional technology.

A method of manufacturing a strain gauge comprises, for achieving the aforesaid object, the steps of: forming a strain generating body with austenitic precipitation hardening type Fe—Ni heat-resisting steel formed by subjecting a material containing 24 to 27 wt. % Ni and 13.5 to 16 wt. % Cr to solution treatment and further to a first aging treatment, forming a silicon oxide film as an insulating film on a portion of the strain generating body, and forming a crystalline silicon thin film as a strain gauge on the silicon oxide film, and the method is characterized in that the strain generating body is subjected to a second aging treatment in the steps of forming the silicon oxide films and the crystalline silicon thin film.

The strain detector manufactured by the method according to the present invention insures high precision and reliability in measurement and enables measurement of a stress of highly corrosive materials because the strain generating body is formed of the austenitic precipitation hardening type Fe—Ni heat-resisting steel excellent in mechanical strength and corrosion resistance. Further, since the silicon oxide film is formed by the plasma CVD method, for example, the internal stress of the formed silicon oxide film can be set to a desired value by adjusting the flow rate of a feed gas for the silicon oxide film. Further, in the steps of forming the silicon oxide film and the crystalline silicon thin film, the strain generating body is exposed to an atmosphere of a prespecified temperature for a prespecified period of time, so that the effect as a second aging treatment is generated to the strain generating body, and therefore the mechanical strength of the strain generating body is further improved and the manufacturing process is simplified.

DETAILED DESCRIPTION OF PREFERRED EMBODIMENT(S)

First Embodiment

Figure 1:
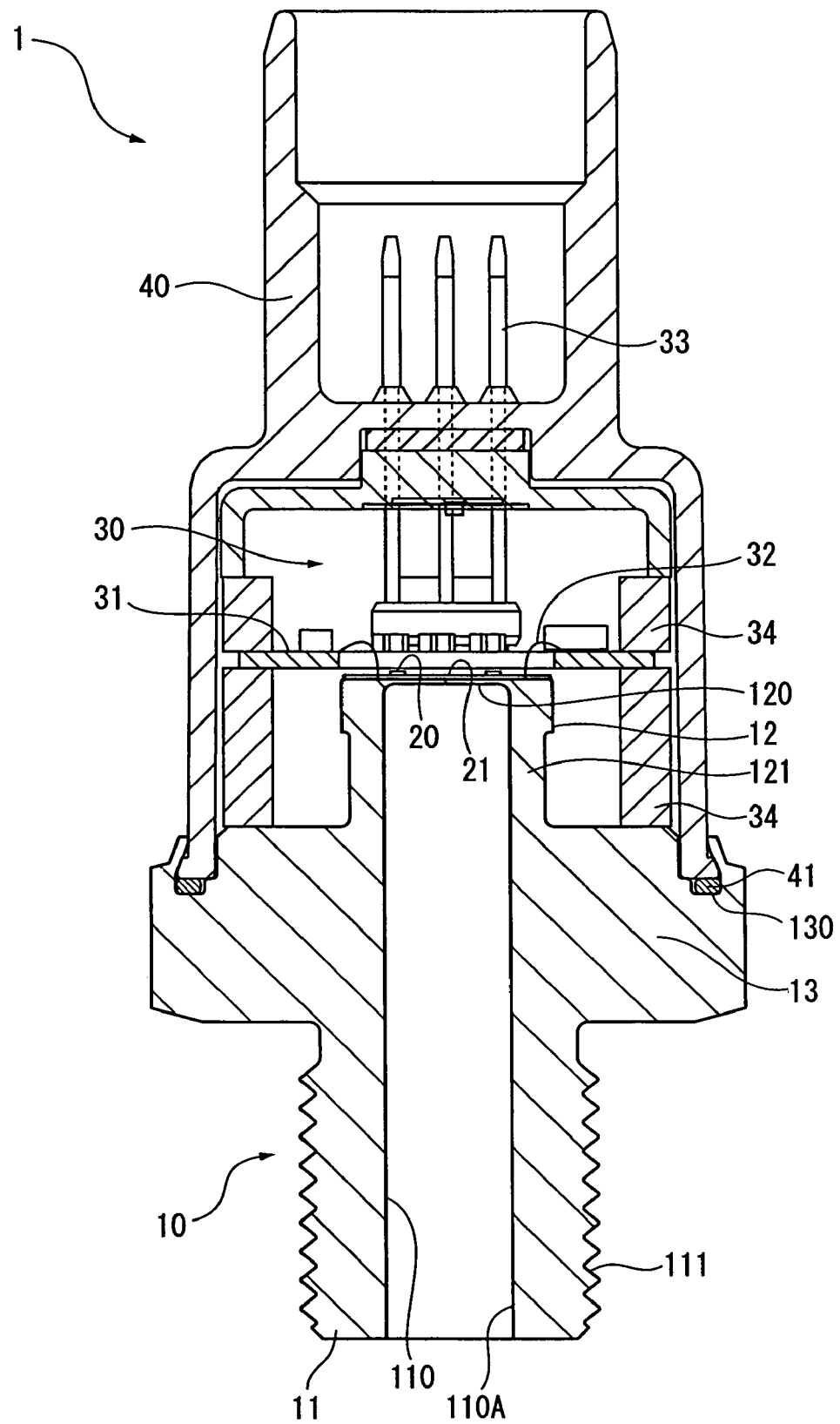
FIG. 1 is a cross-sectional view showing a fluid pressure sensor according to a first embodiment of the present invention.
Figure 2:
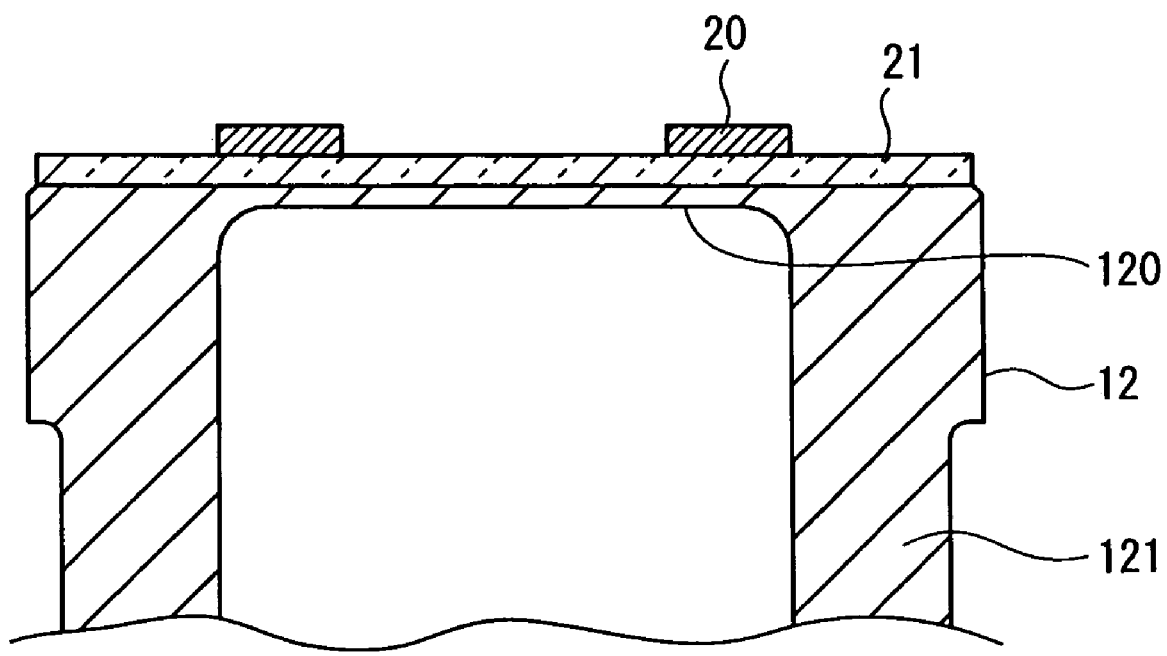
FIG. 2 is a cross-sectional view showing a primary portion of the fluid pressure sensor according to the embodiment in the enlarged state.

A first embodiment of the present invention is described with reference to the related drawings. FIG. 1 is a cross-sectional view showing a fluid pressure sensor 1 according to the first embodiment of the present invention. FIG. 2 is a cross-sectional view showing a primary portion of the fluid pressure sensor according to the embodiment above in the enlarged state. This fluid pressure sensor 1 can be used for measuring the pressure of various types of fluids such as gases, liquids, and the like flowing in piping, and especially for measuring the pressure of fluids such as highly corrosive acidic gases or chemical agents, or hydrogen gas which causes embrittlement. In FIG. 1, the fluid pressure sensor 1 comprises a pressure introducing joint 10, a strain gauge 20, a circuit section 30, and a housing 40.

[Configuration of the Pressure Introducing Joint 10]

The pressure introducing joint 10 is integrally formed including a joint member 11 having a substantially cylindrical shape and connected to piping (not shown) in which a fluid to be measured flows, a diaphragm portion 12 formed at an edge of the joint member 11 and having a bottomed cylindrical shape, and a disk flange portion 13 having a substantially circular shape and formed at a portion of an external peripheral surface of the joint member 11, and is made of the austenitic precipitation hardening type Fe—Ni heat-resisting steel.

This austenitic precipitation hardening type Fe—Ni heat-resisting steel is, for instance, SUH 660 steel. The SUH 660 steel has high mechanical strength and also is excellent in corrosion resistance. The SUH 660 steel contains 24 to 27 wt. % Ni, 13.5 to 16 wt. % Cr, 0.35 wt. % or below Al, and 1.9 to 2.35 wt. % Ti. By being subjected to the solution treatment and first aging treatment (the treatment for keeping the material at 700° C. or higher for 16 hours and then gradually cooling the material to the room temperature) to have Ni3 [Al,Ti] phase (γ' phase), which is an intermetallic compound, precipitated in the austenite phase (γ phase) so as to raise the mechanical strength, the SUH 660 steel has the tensile strength of 1060 MPa or more. It is to be noted that the austenitic precipitation hardening type Fe—Ni heat-resisting steel is not limited to the SUH 660 steel.

A column-like space inside the joint member 11 having a substantially cylindrical shape is a flow path 110 in which a fluid flows, and a screw portion 111 screwed with piping now shown is formed on the external peripheral surface of the joint member 11 at an edge side thereof, and further the diaphragm portion 12 as a strain generating body is provided at the other edge side of the joint member 11. In the flow path 110, an edge of in the side close to the screw portion 111 is a pressure introducing port 110A, and a fluid fed from piping (not shown) is introduced through this portion.

In FIG. 2, the diaphragm portion 12 has a cylindrical portion 121 integrated with the external peripheral surface of the thin wall portion 120 having a substantially circular shape.

The thin wall portion 120 elastically deforms, when a fluid acts thereon, according to the pressure of the fluid. The larger the strain due to this elastic deformation is, the larger electric signal is generated by the strain gauge 20, which enables detection of a more accurate pressure value. Because of the designing requirements, a material used for forming this thin wall portion 120 is required to have the sufficient strength enough to endure even when large strain is generated, and more specifically the material is required to have the tensile strength of 800 MPa or more, and more preferably 1000 MPa or more. In relation to this requirement, the joint member 11 including the thin wall portion 120 is made of the austenitic precipitation hardening type Fe—Ni heat-resisting steel having the tensile strength of 1060 MPa or more, and therefore even when the thin wall portion 120 is made with the smaller thickness, the thin wall portion 120 can sufficiently endure the fluid pressure and ensure a large strain.

The disk flange portion 13 is formed at an edge of the external peripheral surface of the joint member 11, namely in the side where the diaphragm portion 12 is formed, and extends with a disk-like shape outward in the radial direction of this joint member 11. Formed on a surface of this disk flange portion 13 in the side where the diaphragm portion 12 is formed is an engagement section 130 which is a circular groove extending along the periphery thereof, and a housing 40 is engaged in which engagement section 130. The disk flange portion 13 has wrench flat or hexagonal shape, and is used as a portion at which a spanner is set when the screw portion 111 is screwed into the piping (not shown in the figure).

(Configuration of the Strain Gauge 20)

The strain gauge is an elemental device for converting a strain of the thin wall portion 120 to and outputting as an electric signal, and is directly formed, after the silicon oxide film 21 is formed on the external surface of the thin wall portion 120 (film forming step I), at four prespecified positions on the silicon oxide film 21 (film forming step II). The strain gauges 20 are crystalline silicon thin films, and this film is formed all at once by the plasma CVD method in the film forming step II. Electrodes are provided at two edges of each strain gauge 20, and further a pad for loading a voltage to the strain gauges 20 and also for outputting an electric signal is provided on the thin wall portion 120.

The silicon oxide film 21 is provided to shut off electric conduction between the strain gauge 20 and the diaphragm portion 12, and in the film forming step I by the plasma CVD method, the silicon oxide film 21 is provided on the entire external surface of the thin wall portion 120 of the diaphragm portion 12. For this purpose, the silicon oxide film 21 is tightly bonded to the thin wall portion 120, and also texture of the silicon oxide film 21 is formed without defects.

Now descriptions are provided for the step of forming the silicon oxide film 21 on the thin wall portion 120 (film forming step I) and the step of forming the strain gauge 20 on the silicon oxide film 21 (film forming step II).

At first the film forming step I is described below. The pressure introducing joint 10 is placed in a plasma CVD device (not shown) in the state where the entire external surface of the thin wall portion 120 is exposed. A temperature inside the plasma CVD device is set to 410° C., and plasma is generated while introducing dinitrogen monoxide gas and monosilane gas as feed gases at prespecified flow rates respectively. When the plasma is irradiated, the dinitrogen monoxide gas and monosilane gas chemically react to each other on the thin wall portion 120 to form a silicon oxide. By carrying out this reaction for forming the silicon oxide for a desired period of time, the silicon oxide film 21 with desired thickness is homogeneously formed on the thin wall portion 120.

In this case, the thickness of the silicon oxide film 21 is adjusted to the range from 2 to 15 μm, and more preferably to the range from 5 to 12 μm. The thickness of the silicon oxide film 21 is required to be 2 μm or more when the substantial insulating capability (1000 MΩ/50 VDC) is taken into consideration, and to be 15 μm or below when the possibility of cracking of the silicon oxide film 21 due to a stress loaded thereto is taken into consideration.

The internal stress of the silicon oxide film 21 formed as described above is set to the range from −150 to 130 MPa, and more preferably to the range from −120 to 110 MPa at the room temperature by adjusting a flow rate of the monosilane gas as a feed gas. With this adjustment, no crack is generated on the silicon oxide film 21 formed on the thin wall portion 120 even at the temperature in the range from −40° C. to 550° C.

Figure 3:
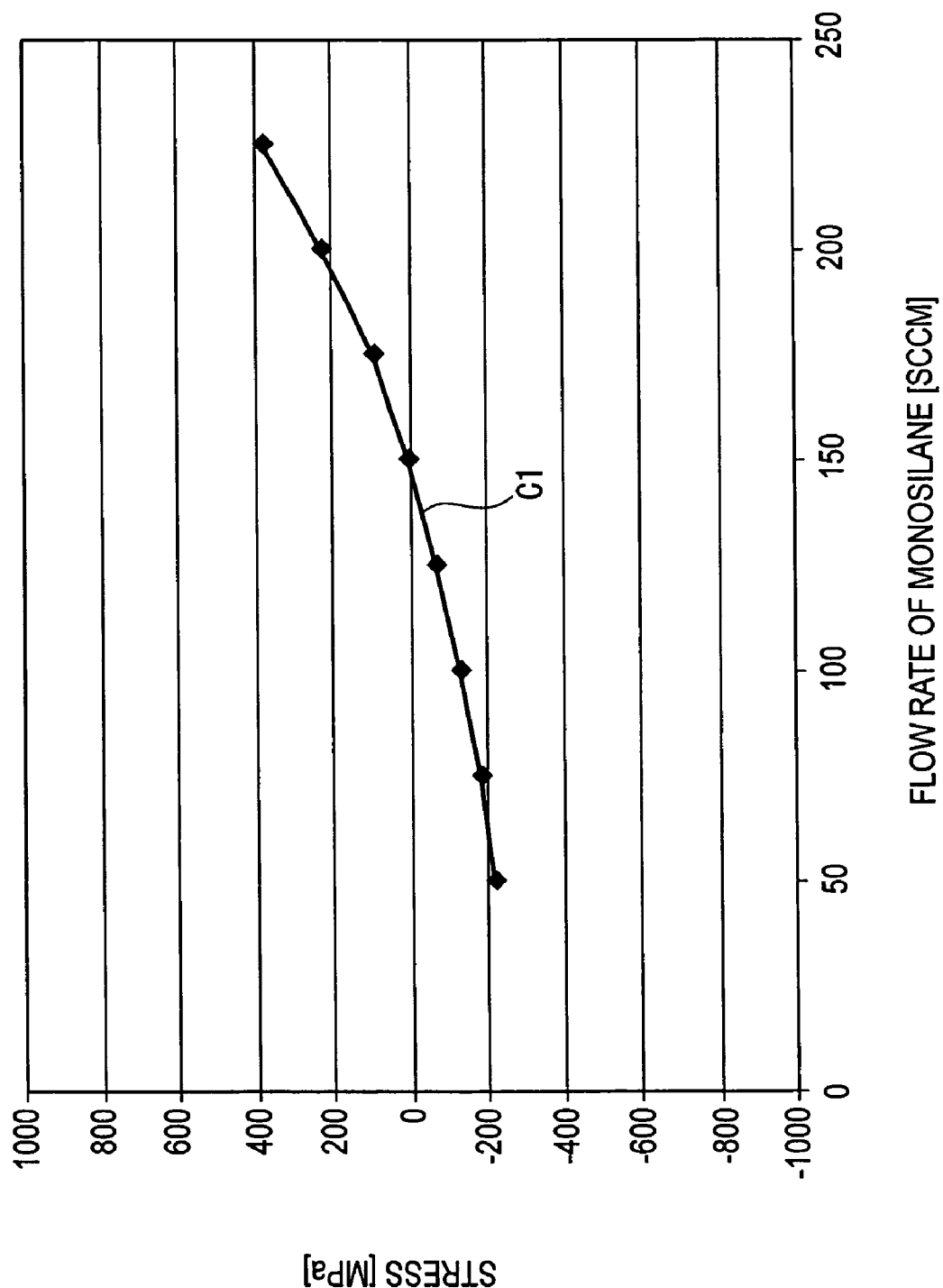
FIG. 3 is a view showing a relation between a flow rate of monosilane gas and an internal stress of the formed silicon oxide film, according to the embodiment.
Figure 4:
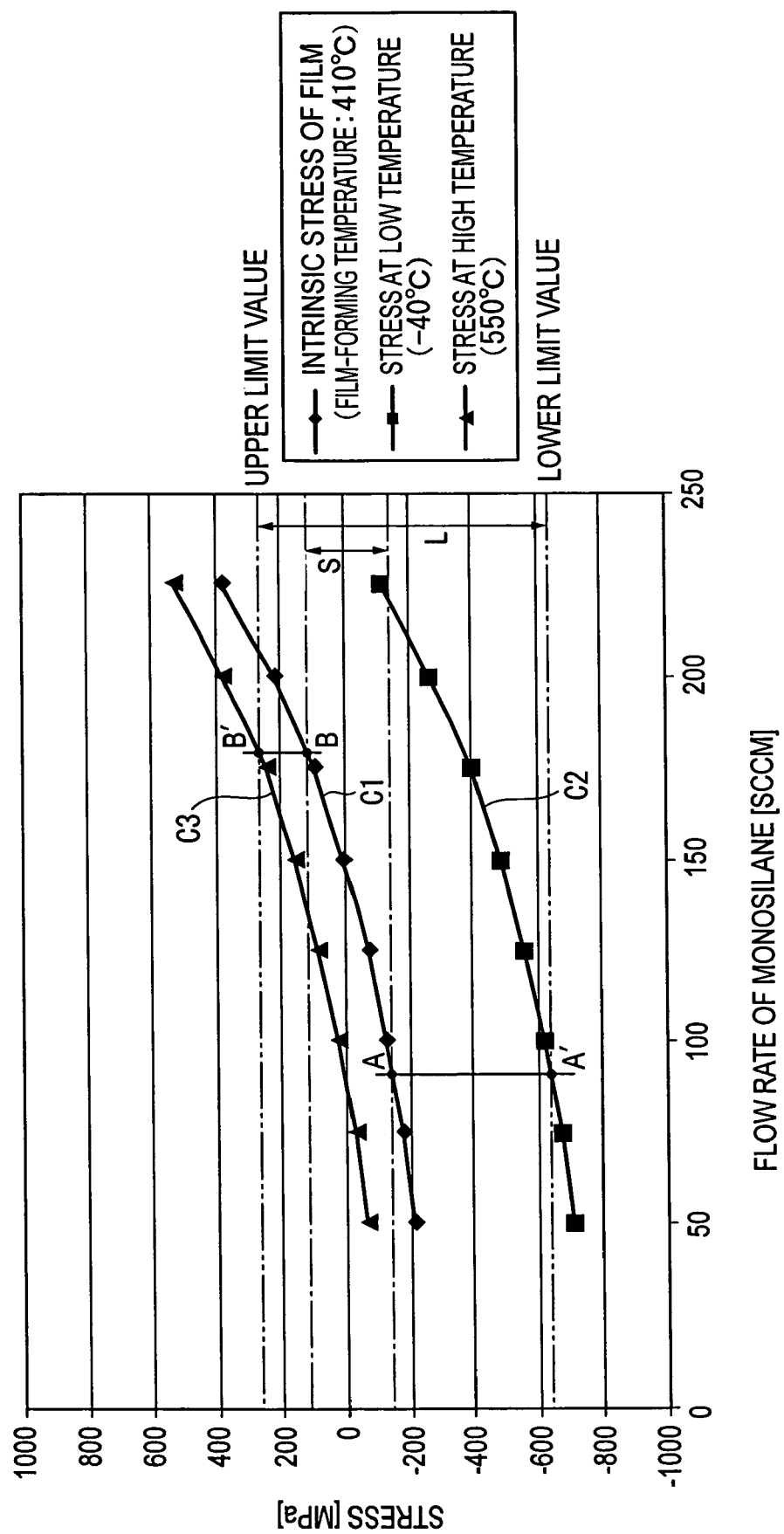
FIG. 4 is a view showing a safe region of an internal stress of the silicon oxide film according to the embodiment.

A relation between an internal stress of the silicon oxide film formed in the film forming step I as described above and a flow rate of monosilane gas as feed gas is described below with reference to the related drawings. FIG. 3 is a view showing a relation between a flow rate of monosilane gas and an internal stress of the silicon oxide film formed as described above. FIG. 4 is a view showing a safety area of the internal stress of the silicon oxide film.

In FIG. 3, in the step of forming the silicon oxide film 21 by the plasma CVD method, when a flow rate of monosilane gas is adjusted to the range from 50 to 230 sccm at 410° C. which is a temperature for film forming, an internal stress (intrinsic stress) of the formed silicon oxide film 21 changes in the range from −200 to 400 MPa along the curve C1 in the figure. From this figure, it is understood that an internal stress of the silicon oxide film 21 can be adjusted to a desired value by adjusting a flow rate of the feed gas according to the necessity.

The thermal expansion coefficient of the formed silicon oxide film as described above is about 1 ppm/° C., and the thermal expansion coefficient of the diaphragm portion 12 (made of austenitic precipitation hardening type Fe—Ni heat-resisting steel containing 24 to 27 wt. % Ni and 13.5 to 16 wt. % Cr), which is a strain generating body, is about 16 ppm/° C., and an elasticity modulus of the silicon oxide film is 73 GPa.

In FIG. 4, cracking occurs in the silicon oxide film 21 according to this embodiment when a stress loaded to the silicon oxide film 21 is below −640 MPa or over 280 MPa (ignoring the stress loaded to the strain gauge 20). In other words, when the stress loaded to the silicon oxide film is within a range L defined by the upper limit value and lower limit value shown with the chain double-dashed line, the silicon oxide film is in the safe state. The stress loaded to the silicon oxide film changes according to a temperature, and as a temperature goes higher, the curve C1 shifts to the upper side, and as the temperature goes lower, the curve C1 shifts to the lower side.

When the silicon oxide film 21 is formed on the diaphragm portion 12 and then the components are exposed to the temperature of −40° C., the stress loaded to the silicon oxide film is about −490 MPa, and the curve C1 shifts toward the curve C2. When a stress of −150 MPa is loaded to the silicon oxide film at the room temperature (point A in the figure), the stress of −640 MPa, which is a lower limit value in the range L, is loaded to the silicon oxide film at −40° C. (point A' in the figure).

Further, when the members are exposed to the temperature of 550° C., the stress loaded to the silicon oxide film is about 150 MPa, and the curve C1 shifts toward the curve C3. When the stress of 130 MPa is loaded to the silicon oxide film at the room temperature (point B in the figure), the stress of 280 MPa, which is the upper limit value in the range L. is loaded to the silicon oxide film at 550° C. (point B' in the figure).

Therefore, for using the silicon oxide film 21 formed on the diaphragm portion 12 without causing damages thereto at a temperature in the range from −40° C. to 550° C., the internal stress of the silicon oxide film 21 is preferably in the range S from the point A to point B in the figure, namely in the range from −150 to 130 MPa.

The preferable range of temperature is set to the range from −40° C. to 550° C., because the lower limit value is set to −40° C. on the presumption that, when the fluid pressure sensor 1 is used under the normal conditions, the peripheral temperature is never below −40° C., and also because the upper limit is set to 550° C. on the presumption that the temperature to which the silicon oxide film 21 and diaphragm portion 12 are exposed when forming a crystalline silicon thin film in the film forming step II is 550° C.

Next, the film forming step II is described below. In the plasma CVD device (not shown), only a portion of the silicon oxide film 21 is exposed, and a portion thereof at which a film is not formed is sealed with a protection material or the like, and the pressure introducing joint 10 is set in the state. Then the temperature inside the plasma CVD device is set to 550° C., and plasma is generated introducing monosilane gas as a feed gas and doping gas such as boron hydroxide gas at prespecified flow rates respectively, when the monosilane gas is thermally decomposed by the plasma on the silicon oxide film 21, and crystalline silicon is generated. By carrying out this processing for film formation for desired period of time, a crystalline silicon thin film with desired thickness is homogeneously formed on the thin wall portion 120.

By carrying out the film forming step I and film forming step II, the second aging treatment is performed to the pressure introducing joint 10 made of the austenitic precipitation hardening type Fe—Ni heat-resisting steel simultaneously. Namely, the pressure introducing joint 10 is exposed to the temperature of 410° C. for a prespecified period of time in the film forming step I, and further to the temperature of 550° C. for a prespecified period of time in the film forming step II, so that the strength of the pressure introducing joint 10 is further improved with the tensile strength raised to 1230 MPa, which is almost the same as the tensile strength of 1300 MPa of the martensitic precipitation hardening type stainless steel. This fact is confirmed in the experiment described below.

[Configuration of the Circuit Section 30]

The circuit section 30 comprises an amplification circuit board 31, a wire bond 32, and input/output terminals 33, and amplifies the electric signal generated by the strain gauge 20 and transfers the amplified electric signal to the outside. A circuit component and electrodes are provided on the amplification circuit board 31. This circuit component loads a voltage to the strain gauge 20, and amplifies a weak electric signal transferred from the strain gauge 20. The electrode on the amplification circuit board 31 is connected to the pad of the strain gauge 20 and to the wire bond 32 in the amplification circuit board 31. There are three input/output terminals 33 communicated to an external terminal (not shown) and the circuit section 30, which outputs the electric signal from the strain gauge 20 amplified by the circuit component to the external terminal, and the external terminal supplies power to the circuit section 30. A spacer 34 is a cylindrical member for fixing the amplification circuit board 31 to the joint member 11, and supports an external periphery of the amplification circuit board 31.

[Configuration of the Housing 40]

The housing 40 is a protection casing having a substantially cylindrical shape which protects the strain gauge 20 and the circuit section 30 from moisture or dust incoming from the outside, and a gasket 41 engaging with the engagement section 130 of the disk flange portion 13 is provided at an edge thereof.

Effects of the First Embodiment

As described above, with the fluid pressure sensor 1 for a strain gauge according to a first embodiment of the present invention, the following effects can be expected.

(1) In the present invention, the austenitic precipitation hardening type Fe—Ni heat-resisting steel having the same mechanical strength as that of the martensitic precipitation hardening type stainless steel is used in the diaphragm portion 12 which is a strain generating body, so that the strain detector having high precision and reliability can be provided.

(2) The strain detector described above is applied to the fluid pressure sensor 1, so that the fluid pressure sensor 1 can be used for measuring the pressure of the fluids difficult to be measured with conventional technology, such as acid gases, corrosive chemical agents, or hydrogen gas which causes embrittlement.

(3) In this embodiment, the silicon oxide film 21 functioning as an insulating film is directly formed on the thin wall portion 120 of the diaphragm portion 12 without using any adhesive, so that high reliability of the strain detector is insured by controlling, even in the diaphragm portion 12 in which the thermal expansion coefficient of a material reaches 16 ppm/° C., the internal stress and the film thickness according to the necessity.

(4) In this embodiment, an internal stress of the silicon oxide film 21 is adjusted to the range from −150 to 130

MPa when formed on the thin wall portion 120 by taking into considerations the differences in the thermal expansion coefficient and elasticity modulus between the silicon oxide film 21 and the austenitic precipitation hardening type Fe—Ni heat-resisting steel. Because of this feature, even when the fluid pressure sensor 1 is used for a long period of time, junction between the thin wall portion 120 and the silicon oxide film 21 is never degraded. Further even when the fluid pressure sensor 1 is exposed to the atmosphere having the temperature in the range from −40 to 550° C., cracking never occurs in the texture of the silicon oxide film 21, and a highly reliable pressure value can be obtained.

In addition, because the thickness of the silicon oxide film 21 is adjusted to the range from 2 to 15 μm, the insulating capability of the silicon oxide film 21 is ensured, and further cracking due to too large film thickness never occurs in the texture of the silicon oxide film 21.

(5) In this embodiment, the strain gauge 20 is a crystalline silicon thin film, and is directly formed on the silicon oxide film 21 by the plasma CVD method without using any adhesive, so that the strain gauge 20 and the silicon oxide film 21 are bonded to each other tightly, and strain of the diaphragm portion 12 is accurately delivered to the strain gauge 20, so that the pressure of a fluid can be measured with high precision.

(6) In this embodiment, the silicon oxide film 21 is formed all at once by the plasma CVD method, and therefore the time and labor required for manufacturing the fluid pressure sensor 1 are reduced compared to those required with conventional technology.

Further also the strain gauge 20, which is a crystalline silicon thin film, is formed all at once by the plasma CVD method on the silicon oxide film 21 without using any adhesive, so that the time and labor required for manufacturing the fluid pressure sensor are reduced compared to those required with conventional technology.

(7) In the film forming step I, the silicon oxide film 21 is formed by the plasma CVD method which may be carried out at a low temperature, so that the texture of metallic material for the diaphragm portion 12 is never degraded by a temperature during film formation.

Further in the film formatting step II, formation of the crystalline silicon thin film is performed by the plasma CVD method which may be carried out at a low temperature, so that the silicon oxide film 21 is not damaged by a temperature during film formation, nor is degraded the texture of the metallic material for the diaphragm portion 12.

(8) In the film forming step I, an internal stress of the silicon oxide film 21 can freely be adjusted only by changing a flow rate of feed gas in the range from −150 to 130 MPa according to the necessity. Because of this feature, an internal stress of the silicon oxide film 21 can be set to a desired value with the simple configuration.

(9) In this embodiment, by carrying out the film forming step I and film forming step II, the diaphragm portion 12 made of the austenitic precipitation hardening type Fe—Ni heat-resisting steel is subjected to the second aging treatment. Therefore the tensile strength of the diaphragm portion 12 is raised to about 1230 MPa, and this value is substantially equivalent to that of the tensile strength 1300 MPa of the martensitic precipitation hardening type stainless steel, so that the fluid pressure sensor 1 ensured high precision and reliability.

Further the film forming step I and film forming step II provide the effect of the second aging treatment, so that it is not necessary to separately provide a thermal processing step, and therefore the manufacturing is simplified, and the fluid pressure sensor can be manufactured with relatively low cost.

[Test]

Figure 5:
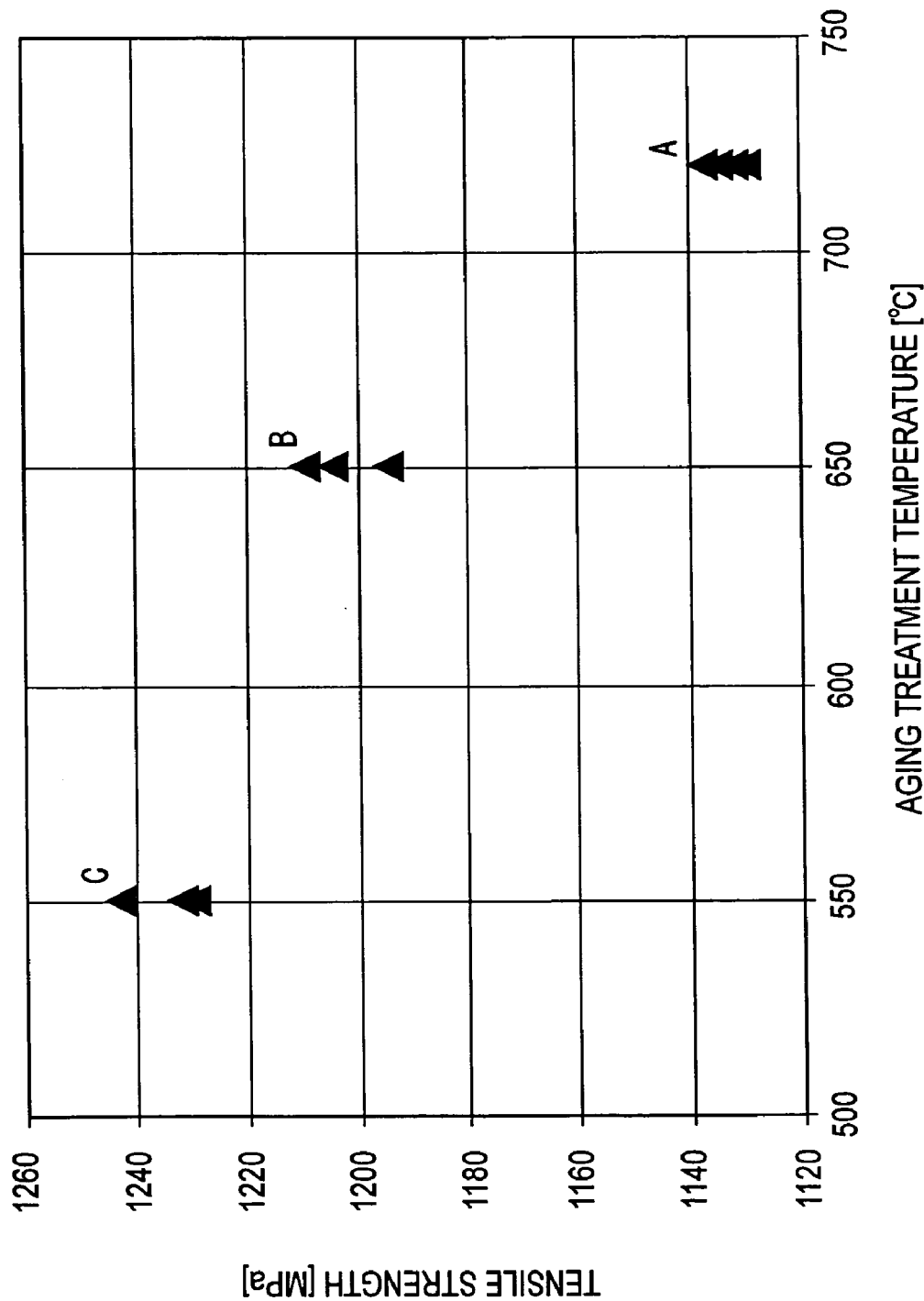
FIG. 5 is a view showing a relation between tensile strength of a strain generating body and temperature for the second aging treatment, according to the embodiment.

A test for confirming the effects provided in this embodiment is described below. More specifically, the effect of the second aging treatment to the austenitic precipitation hardening type Fe—Ni heat-resisting steel are described with reference to the drawings. FIG. 5 is a view showing a relation between the tensile strength of the diaphragm portion 12 and a temperature in the second aging treatment.

In this embodiment, the second aging treatment is performed to the austenitic precipitation hardening type Fe—Ni heat-resisting steel, the thin wall portion 120 having a substantially circular shape, and cylindrical portion 121 by carrying out the film forming step I and film forming step II. The following experiment was carried out to confirm the effects provided by the second aging treatment.

In FIG. 5, before the second aging treatment is performed, the austenitic precipitation hardening type Fe—Ni heat-resisting steel is subjected to the solution treatment as well as to the first aging treatment (the treatment for keeping the material at 700° C. or higher for 16 hours and then gradually cooling the material to the room temperature), and this material has the tensile strength of 1060 MPa or more. The material in this state is described as sample A in the following descriptions. A plurality of samples A were subjected to the second aging treatment by being kept at 650° C. for one hour and then gradually being cooled to the room temperature, the tensile strength of the plurality of samples was raised to about 1200 MPa (sample B). Similarly, a plurality of samples A were subjected to the second aging treatment by being kept at 550° C. for one hour and then gradually being cooled down to the room temperature, the tensile strength of the plurality of samples A was raised to about 1230 MPa (sample C).

This effect was provided because finer intermetallic compound Ni3 [Al,Ti] phase (γ' phase), which was not precipitated during the first aging treatment, was dispersed and precipitated in the austenite phase (γ phase) by the second aging treatment. Generally the intermetallic compound phase (γ' phase) is dispersed and precipitated more finely in the γ phase which is a mother phase, the mechanical strength of the material is improved further. In this test, it was confirmed that the temperature most suited to the second aging treatment is 550° C. (to provide sample C). This means that the most remarkable effect can be obtained at the temperature employed in the film forming step II.

Second Embodiment

Figure 6A:
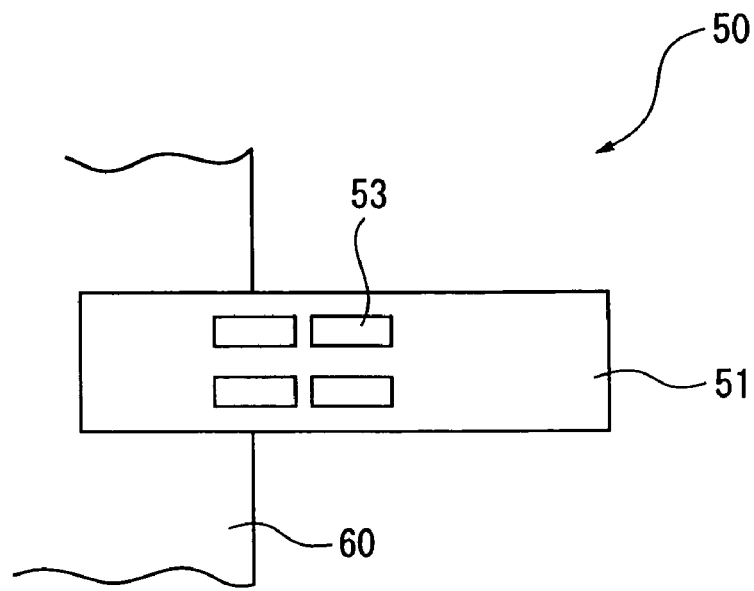
FIG. 6A is a flat view showing a strain detector according to a second embodiment of the present invention.
Figure 6B:
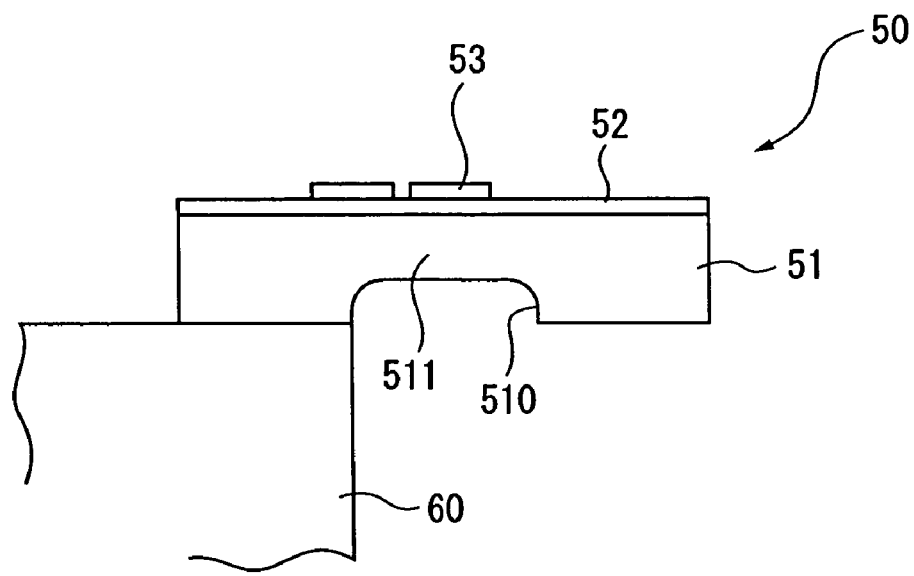
FIG. 6B is a front view showing the strain detector according to the second embodiment of the present invention.

Descriptions are provided below for a second embodiment of the present invention with reference to the related drawings. FIG. 6A and FIG. 6B are views each showing a strain detector 50 according to the second embodiment of the present invention, and FIG. 6A is a flat view showing the strain detector 50, while FIG. 6B is a front view showing the same. In this strain detector 50, when a load is applied to a tip section of a cantilever strain generating body 51, the strain generating body 51 is deflected, and the strain is detected as an electric signal by a strain gauge 53 to measure the load. This strain detector may be used, for instance, as a scale.

In FIG. 6A and FIG. 6B, the strain detector 50 has the cantilever strain generating body 51, a silicon oxide film 52 which is an insulating layer, and a strain gauge 53. The strain generating body 51 is a block body having a substantially rectangular shape with the prespecified thickness, and a base edge thereof is fixed to a fixing member 60, while a tip section thereof is a free edge, and the tip section fluctuates when a load is applied thereto. A recess portion 510 is formed on a surface of this strain generating body 51 at a substantially intermediate point between the tip and the base edge, so that the strain generating body 51 has a thin wall portion 511 formed at the substantially intermediate position between the tip and the base edge. When a load is applied to the tip of this strain generating body 51, this thin wall portion 511 largely bends, and large strain is generated. The austenitic precipitation hardening type Fe—Ni heat-resisting steel having high mechanical strength and excellent corrosion resistance is used as a material for the strain generating body 51, and for instance, SUH 660 is used as the material.

The silicon oxide film 52 is formed on an entire surface of the strain generating body 51 contrary to the surface on which the tapered recess portion 510 is formed. The method of forming this silicon oxide film 52 (the film forming step I) is the same as that described in the first embodiment above, and the internal stress is set to the range from −150 to 130 MPa by means of the plasma CVD method with the film thickness set to the range from 2 to 15 μm.

The strain gauge 53 is an elemental device for converting strain of the thin wall portion 511 to an electric signal and outputting the electric signal, and is directly formed at each of prespecified four positions on the silicon oxide film 52 (film forming step II). The strain gauges 53 are crystalline silicon thin films, and are formed all at once by the same method as that described in the first embodiment by the plasma CVD method. Electrodes are provided at two edges of each strain gauge 53, and these electrodes are connected to each other to form a bridge circuit, and further a pad for outputting an electric signal and for loading a voltage to the strain gauges 53 is provided on the silicon oxide film 52.

In the second embodiment, like in the first embodiment, the second aging treatment is performed to the strain generating body 51 formed with the austenitic precipitation hardening type Fe—Ni heat-resisting steel during execution of the film forming step I and film forming step II. The strain generating body 51 is exposed to the temperature of 410° C. for a prespecified period of time in the film forming step I, and to the temperature of 550° C. in the film forming step II for a prespecified period of time in the film forming step II, so that the tensile strength of the strain generating body 51 is further improved to 1230 MPa, which is almost the same value as the tensile strength of 1300 MPa of the martensitic precipitation hardening type stainless steel. This fact was confirmed in the test described above.

Effects Provided in the Second Embodiment

As described above, with the strain detector 50 according to the second embodiment of the present invention, the following effect can be expected, in addition to the effects (1) and (3) to (9) described above.

(10) As the austenitic precipitation hardening type Fe—Ni heat-resisting steel excellent in corrosion resistance is used as a material for the strain generating body 51, the strain detector 50 can be used for measurement of a load even in the corrosive environment, or in the environment filled with high concentration hydrogen gas which causes embrittlement.

[Variant]

The present invention is not limited to the first and second embodiments described above, and modifications and improvements thereof in the range in which the objects of the present invention can be attained are included in a scope of the present invention.

For instance, the method of forming a silicon oxide film formed on a portion of the strain generating body in the first and second embodiments is not limited to the plasma CVD method, and other CVD methods or the sputtering method may be employed. Further in the first embodiment, the thin wall portion 120, which is a strain generating body, is circular, but the shape of the thin wall portion 120 is not limited to a circular shape, and the thin wall portion 120 may be, for instance, square. Further in the second embodiment, the strain generating body 51 is a cantilever beam based on a substantially rectangular block body, but the strain generating body 51 may be a rod-like or plate-like cantilever beam or a straddle beam.

Further, in the first embodiment, the silicon oxide film 21 is formed on an external surface of the thin wall portion 120, then the strain gauges 20 are formed on this silicon oxide film 21, electrodes are provided on both edges of each strain gauge 20 to form a bridge circuit, and further a pad is provided for loading a voltage and outputting an electric signal to the strain gauges 20, but in addition a protection layer covering all of the components may be provided. For instance, a silicon nitride film may be used as the protection layer.

Similarly, in the second embodiment, the silicon oxide film 52 and strain gauges 53 are formed in this order on an external surface of the thin wall portion 511, and the electrodes and pads are provided for each strain gauge 53, but in addition a protection layer covering all of the components may be provided.

The joint member 11 in the first embodiment and the strain generating body 51 in the second embodiment are made of a single material respectively, but the present invention is not limited to this configuration. For instance, a laminated structure may be employed in the present invention, and in that case various members of the laminated structure may be coated with different materials respectively.

The priority application Number JP2004-216651 upon which this patent application is based is hereby incorporated by reference.

What is claimed is:

1. A strain detector comprising:
   a strain generating body generating strain in response to an external stress generated by a fluid pressure;
   an insulating film formed at least on a portion of said strain generating body; and
   a strain gauge formed on said insulating film for detecting the strain generated in said strain generating body as an electric signal,
   wherein said strain generating body is made of an austenitic precipitation hardening type Fe—Ni heat-resisting steel that is prepared by being subjected to a solution treatment, a first aging treatment and a second aging treatment, and said insulating film is formed from a silicon oxide film having an internal stress of −150 to 130 MPa.

2. The strain detector according to claim 1,
   wherein said strain generating body is made of the austenitic precipitation hardening type Fe—Ni heat-resisting steel containing 24 to 27 wt. % Ni and 13.5 to 16 wt. % Cr.

3. The strain detector according to claim 1, wherein said silicon oxide film has the thickness in the range from 2 to 15 μm.

4. The strain detector according to claim 1, wherein said strain gauge is a crystalline silicon thin film.

5. A method of manufacturing a strain detector comprising the steps of:

forming a strain generating body with an austenitic precipitation hardening type Fe—Ni heat-resisting steel prepared by subjecting a material containing 24 to 27 wt. % Ni and 13.5 to 16 wt. % Cr to solution treatment and further to a first aging treatment;

forming a silicon oxide film as an insulating film on a portion of said strain generating body, with an internal stress thereof adjusted to be −150 to 130 MPa; and forming a crystalline silicon thin film as a strain gauge on said silicon oxide film;

wherein said strain generating body is subjected to a second aging treatment during the steps of forming said silicon oxide film and said crystalline silicon thin film.

* * * * *